Nov. 29, 1966       O. M. ULBING       3,288,257
CLUTCH DEVICE WITH PRESSURE MULTIPLYING AND AUTOMATIC
WEAR COMPENSATING MEANS
Filed Feb. 24, 1964       5 Sheets-Sheet 3
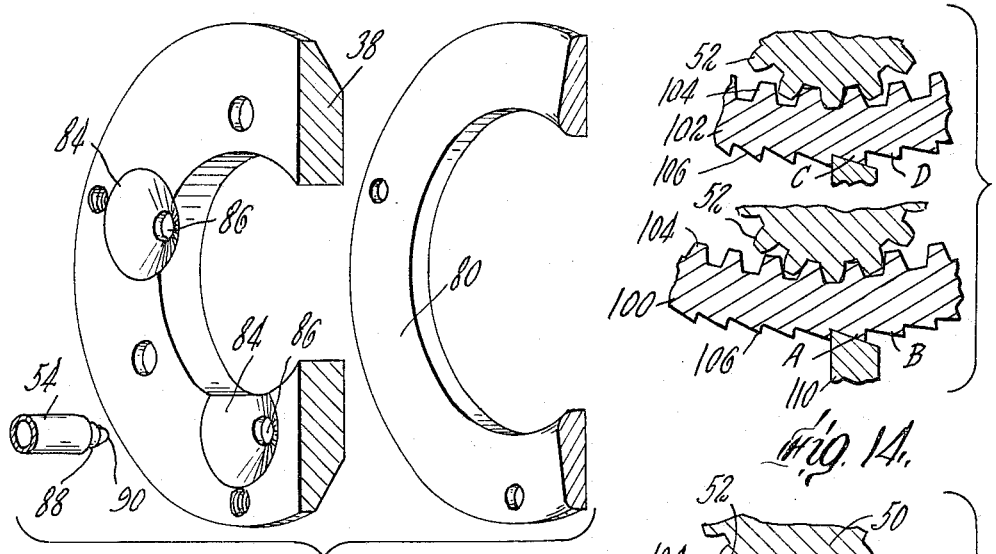
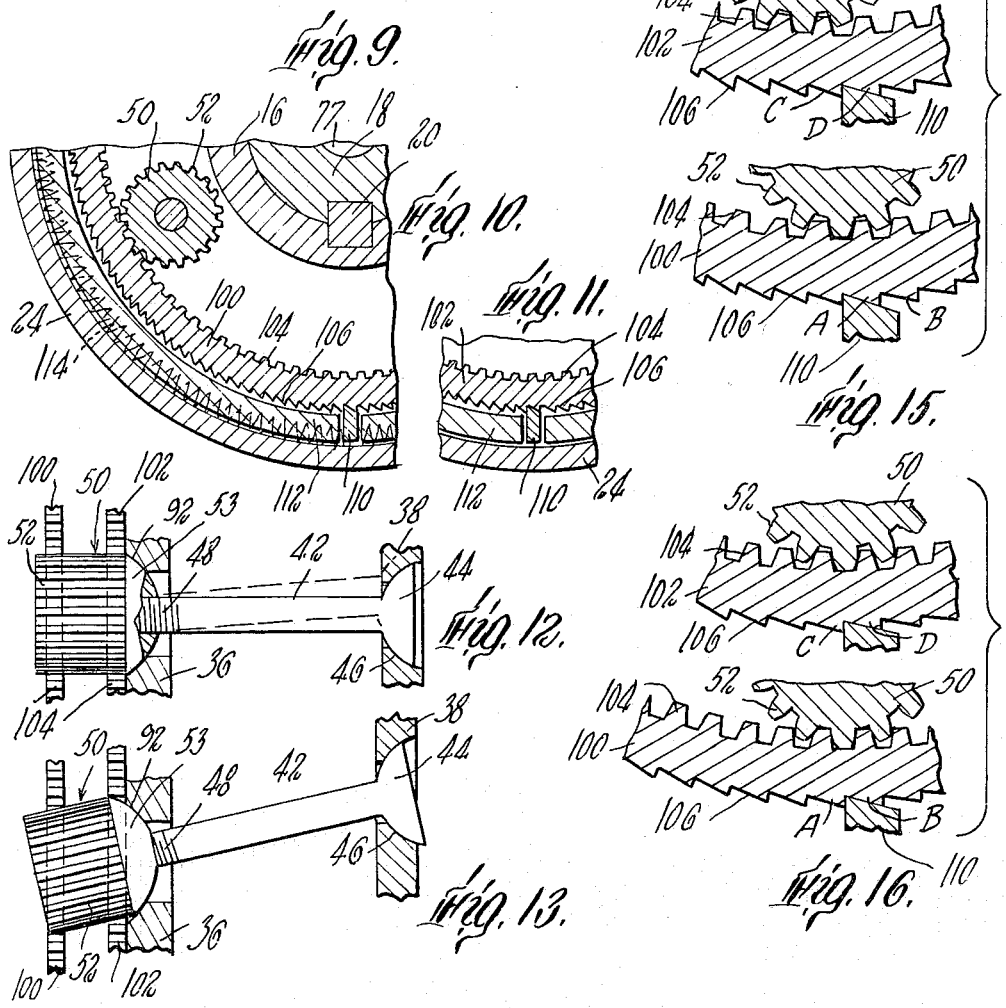

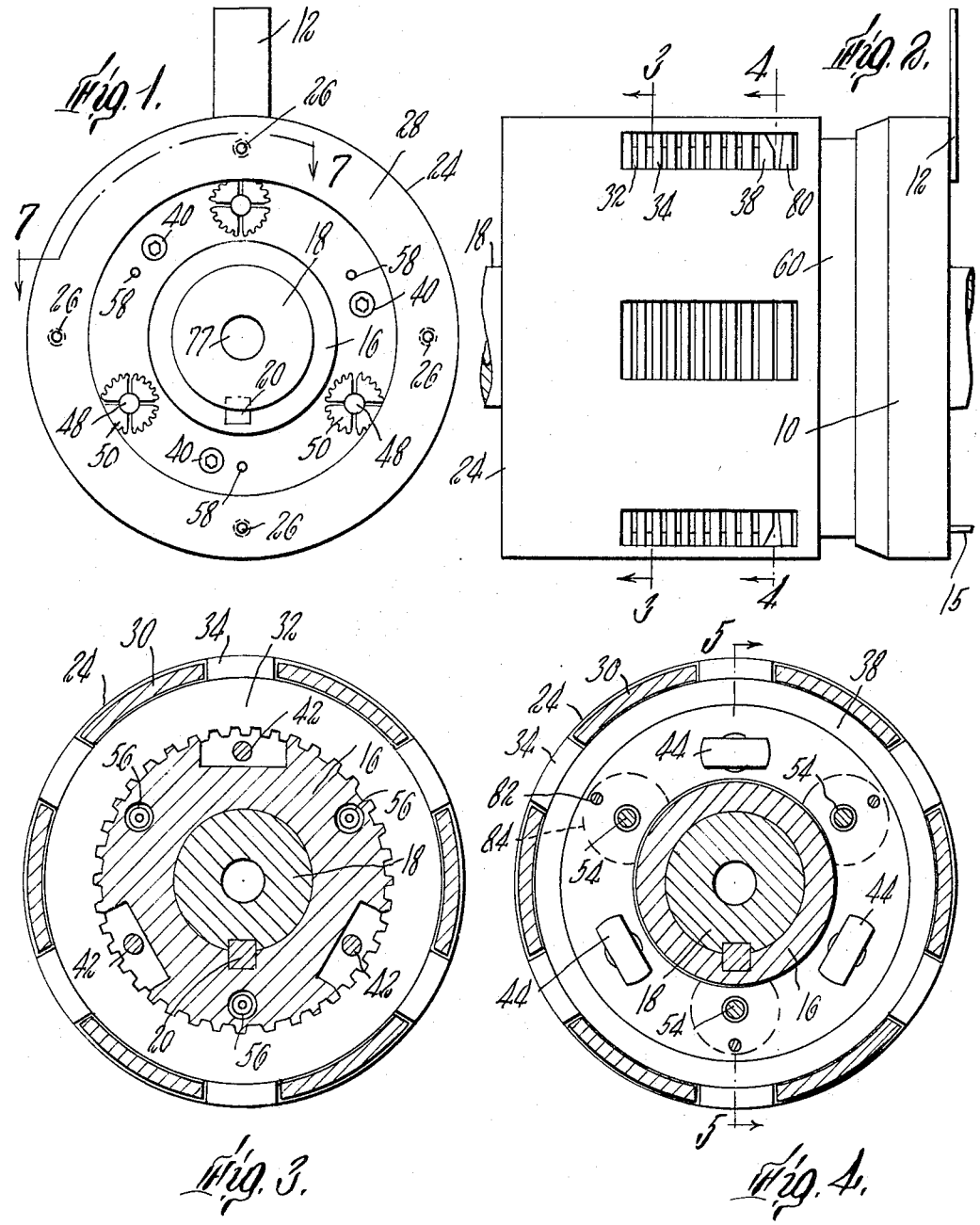

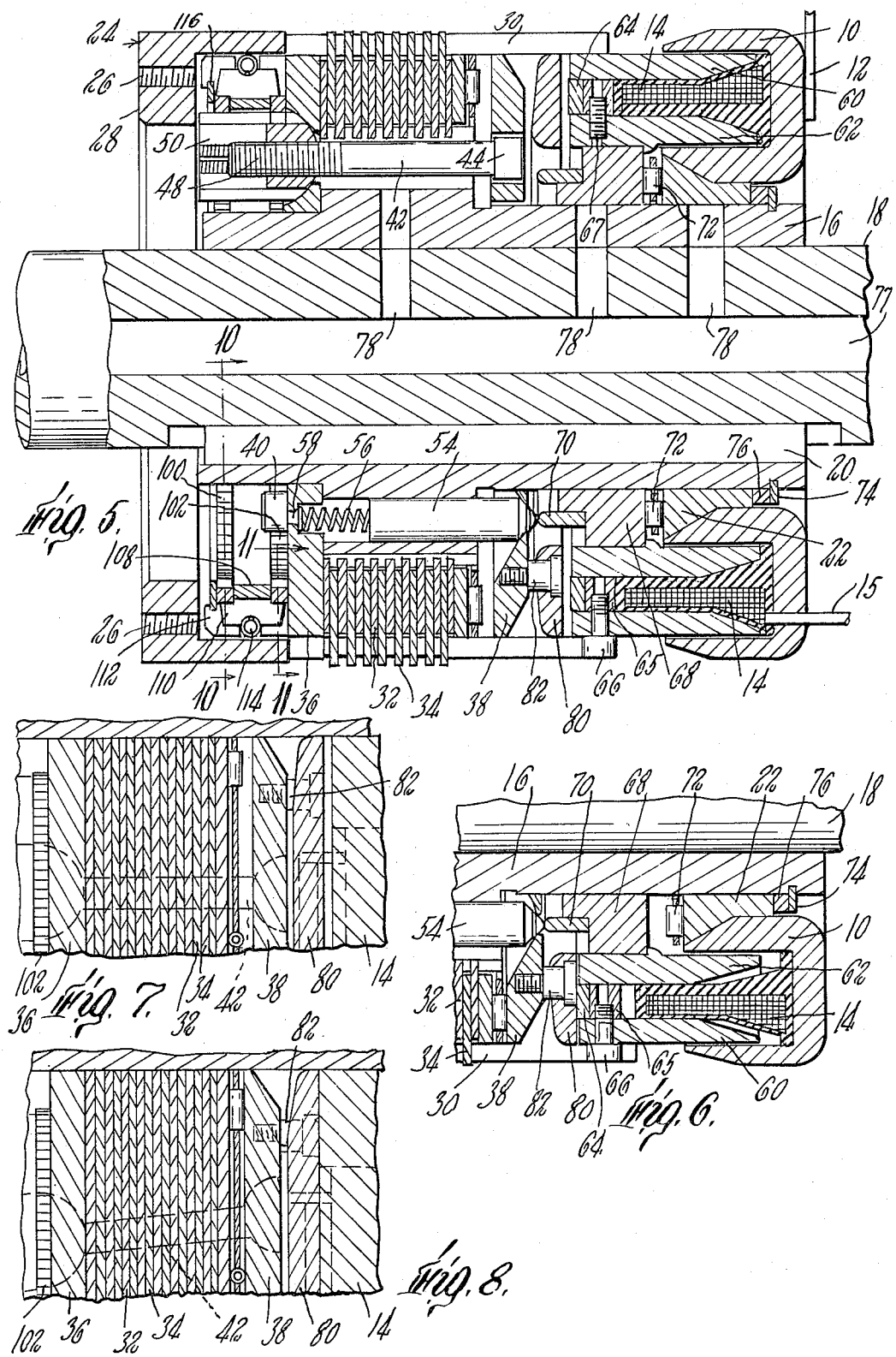

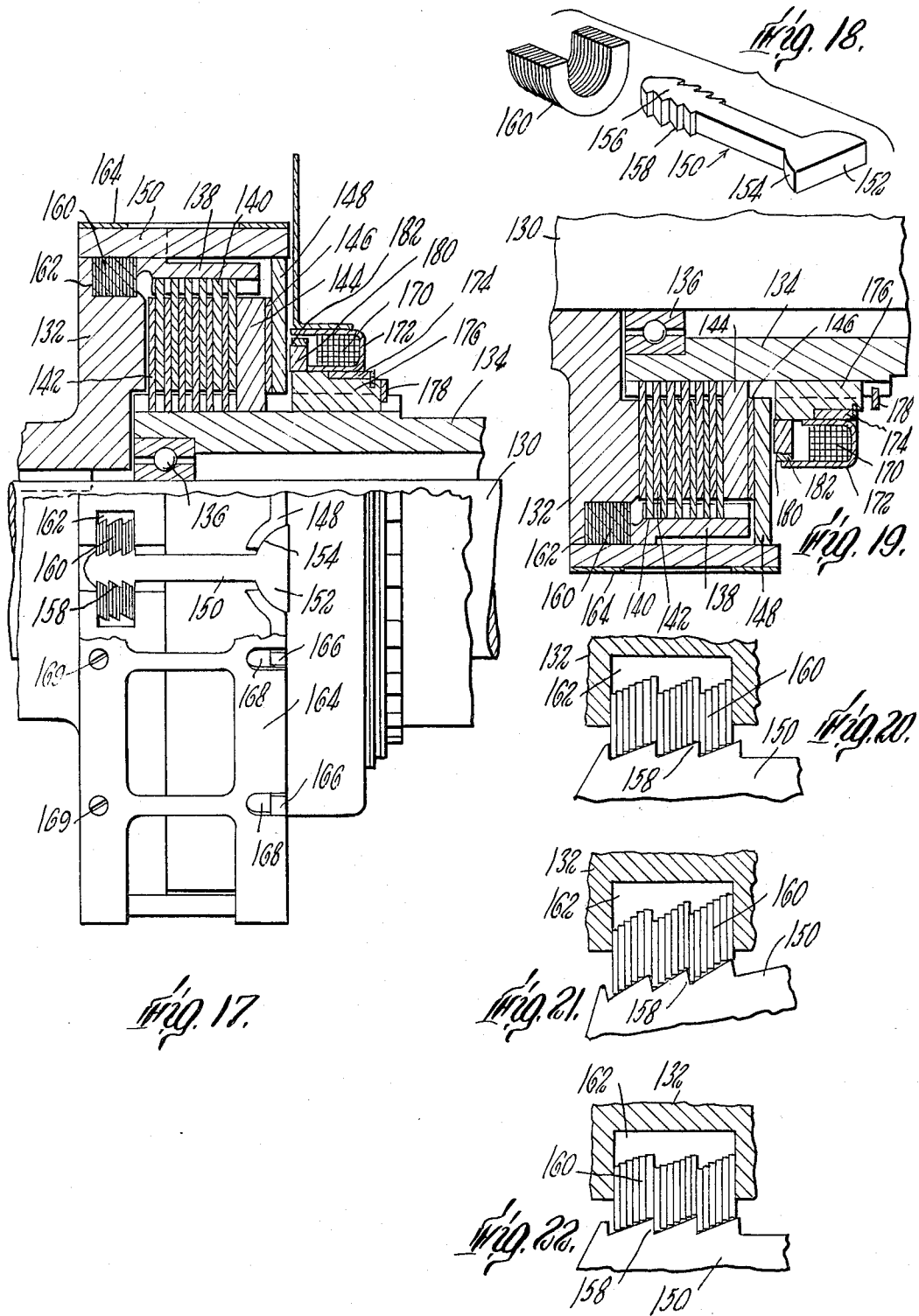

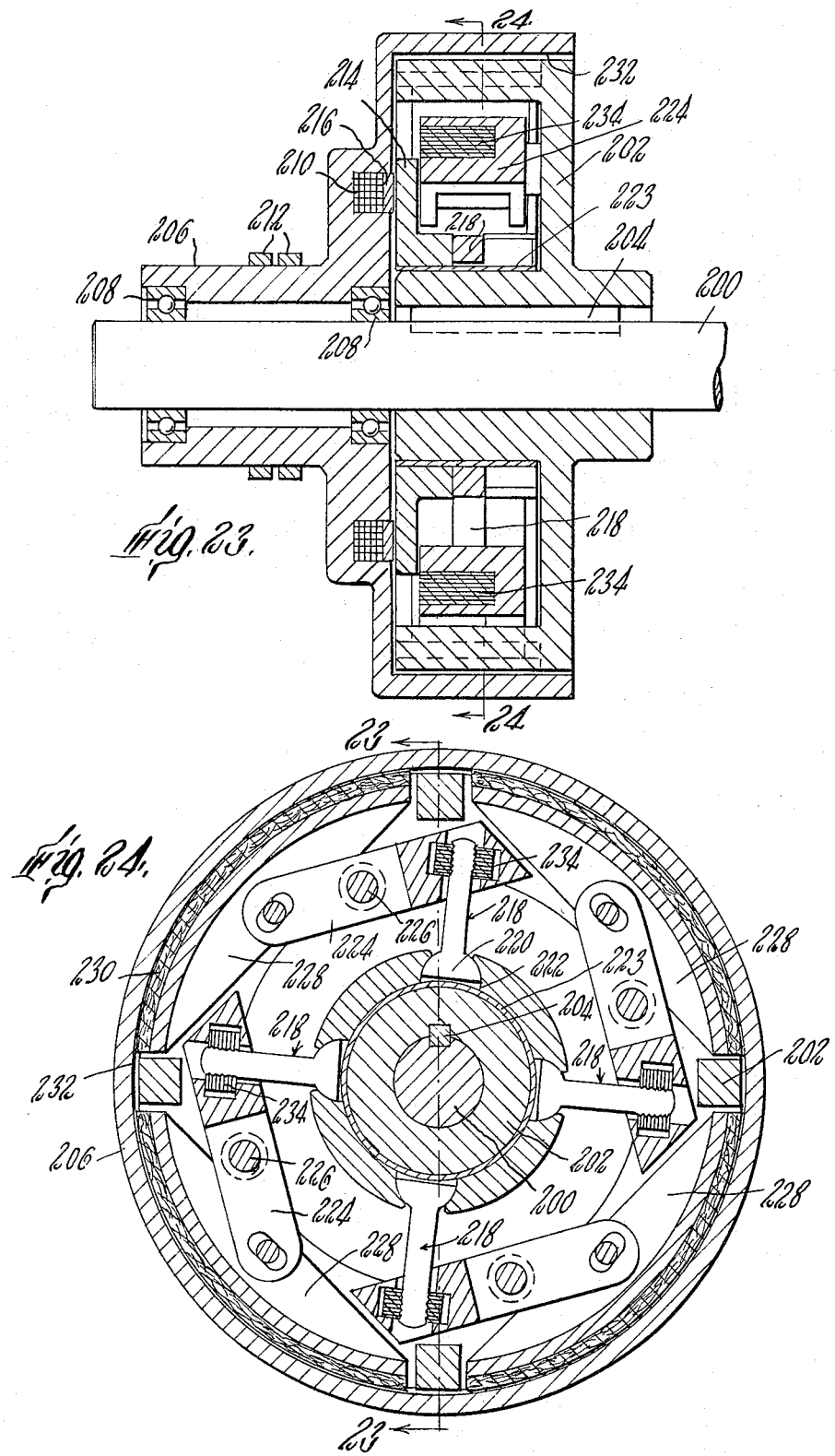

United States Patent Office 3,288,257
Patented Nov. 29, 1966

3,288,257
CLUTCH DEVICE WITH PRESSURE MULTI-
PLYING AND AUTOMATIC WEAR COM-
PENSATING MEANS
Otmar M. Ulbing, R.F.D. 1, Berkshire, N.Y.
Filed Feb. 24, 1964, Ser. No. 346,839
21 Claims. (Cl. 192—35)

This invention relates to coupling devices and more particularly to mechanisms of the clutch type for coupling mechanical elements together.

It is an object of this invention to provide novel and improved coupling devices for transmitting mechanical forces. A more particular object of the invention is to provide a novel and improved a compact electromagnetic clutch which is reliable in operation and is capable of applying higher coupling pressures to the stack of clutch discs than is possible with conventional magnetic actuators.

Another object of the invention is to provide novel and improved wear compensation mechanisms for use in such coupling devices.

A further object of the invention is to provide novel and improved wear compensation mechanisms that operate automatically as a function of the operation of the coupling device.

Still another object of the invention is to provide novel and improved clutching mechanisms including means for preventing the unintentional engagement of the clutch mechanism in response to transient angular acceleration forces.

In accordance with the invention an actuator element is incorporated in a coupling device, which element is effectively tilted to engage the device. The actuator elements in a preferred form bridge a stack of clutch discs which are disposed between two pressure plates. Each actuator element, in the form of a tie bar, is secured to the two pressure plates and rotation of one of the pressure plates relative to the other effectively tilts the tie bars. The tilting of the tie bars moves the pressure plates toward one another, creating a compressive force on the interposed stack of clutch discs and forcing them together in a clutch engaging operation. A feature of the structure is the inclusion of novel means responsive to the inclination of the actuator element to automatically adjust the actuator element's effective length as a function of the angle of tilt in a coupling surface wear compensating operation. Another feature incorporated in the preferred form of clutch is a locking mechanism which positively prevents relative rotation of the two pressure plates unless the clutch is operated.

Other features, objects, and advantages of the invention will be seen as the following detailed description of preferred embodiments thereof progresses, in conjunction with the drawings, in which:

FIG. 1 is an end view of a clutch constructed in accordance with the invention;

FIG. 2 is a side view of the clutch shown in FIG. 1;

FIGS. 3 and 4 are sectional views through the clutch taken along the lines 3—3 and 4—4, respectively, of FIG. 2;

FIG. 5 is a cross-sectional view of the clutch taken along the line 5—5 of FIG. 4;

FIG. 6 is a cross-sectional view similar to FIG. 5 of a portion of the clutch showing clutch elements in engaged position;

FIGS. 7 and 8 are diagrammatic views showing the relative positions of the clutch plates and tie bar in disengaged and in engaged positions, respectively;

FIG. 9 is a perspective view of the armature, an actuator plate, and a portion of a lock pin employed in the clutch structure;

FIGS. 10 and 11 are diagrammatic views taken along the lines 10—10 and 11—11, respectively, of FIG. 5 of portions of the tie bar adjusting mechanism;

FIG. 12 is a diagrammatic view of a tie bar in disengaged position indicating in dotted line the tilting movement of a tie bar when the clutch is engaged;

FIG. 13 is a diagrammatic view indicating the nature of excessive inclination of a tie bar;

FIGS. 14–16 are series of diagrammatic views indicating the adjustment of the tie bar length;

FIG. 17 is a side view, partially in section, of a second embodiment of the clutch constructed in accordance with the invention;

FIG. 18 is a perspective view of the tie bar and securing laminations employed in the clutch shown in FIG. 17;

FIG. 19 is a sectional view of a portion of the clutch shown in FIG. 17 in engaged position;

FIGS. 20–22 are diagrammatic views illustrating the tie bar length adjustment mechanism; and FIGS. 23 and 24 are sectional views of a drum clutch embodiment taken along the lines 23—23 of FIG. 24 and 24—24 of FIG. 23, respectively.

The clutch unit shown in FIGS. 1–5 is an electromagnetic clutch and includes a fixed field structure 10 having a securing bracket member 12. A field coil 14 is secured within structure 10 and leads 15 are provided for connection to an external source of power. The field structure 10 is mounted for relative rotation on sleeve 16 which in turn is secured on driving shaft 18 and permits relative rotation between structure 10 and sleeve 16. The driven portion of the clutch includes a cylindrical housing 24 which has an axially extending sleeve portion 30 and an end flange 28 in which are located a plurality of threaded holes 26 by means of which the member to be driven is secured to the clutch.

The clutch includes two sets of clutch discs 32, 34 which may be of conventional friction material and are disposed in a stack. The clutch discs 32 are splined on sleeve 16, and the clutch discs 34 are splined to the sleeve portion 30 of housing 24. This stack of clutch discs is positioned between two members, a back-up plate 36 and an actuator plate 38. Plate 36 is secured to sleeve 16 by means of bolts 40, and plate 38 is secured to plate 36 by means of three tie bars 42. Each tie bar has a head portion 44 having a spherical lower surface 46 and a threaded foot portion 48. A nut 50, threaded on foot 48, has its cylindrical outer surface 52 formed with gear teeth and a spherically formed end surface 53. Also extending through sleeve 16 between plates 36, 38 are three lock pin mechanisms including pins 54 and springs 56. Apertures 58 provide a flow path for lubrication oil if desired.

With more particular reference to FIG. 5, the electromagnetic actuator includes a field coil 14 mounted within the U shaped pole piece 10 and through energizing leads 15 extend. Disposed on each side of the field coil 14 are cylinders 60, 62 of magnetic material, each of which extends parallel to the axis of rotation of the clutch and is free to move axially and to rotate independently of the pole piece 10. A non-magnetic ring 64 of friction material is positioned between the cylinders at the forward end thereof, and the cylinders 60, 62 and ring 64 are secured together by means of ring 65 and fasteners 66, 67 for rotation as a unit on bearing 68 that is seated on sleeve 16. This flux path unit is coupled to sleeve 30 by bolt 66. A lock release ring 70 is also carried by bearing 68 and protrudes axially forward thereof.

Pole piece 10 is supported on sleeve 16 by bearing 22 and thrust bearing 72 is disposed between bearings 22 and 68. Snap ring 74 secures the actuator assembly on sleeve 16 and a seal 76 or spacer may be interposed depending on whether the clutch is to be operated dry or wet. (An axially extending bore 77 in shaft 18, together with a plurality of radially extending passages 78 in communication therewith, may be provided where it is desired to supply cooling fluid under pressure to the clutch.)

As indicated above, pressure plates 36, 38 are fixed to sleeve 16 and rotate therewith. An armature ring 80 is secured to plate 38 by means of bolts 82. Plate 38 has spherical recesses in its surface facing field coil 14 in which the heads 44 of tie bars 42 are positioned so that the tie bars may rock or rotate therein. In the opposite surface (as shown in FIG. 9) there are three conical depressions 84 surrounding apertures 86. Lock pins 54 are biased into these depressions so that their shoulder portions 88 seat on the depression surface and their conical points 90 protrude through the apertures 86 and beyond the plate as indicated in FIG. 5.

Each tie bar is secured to the forward pressure plate 36 by a spherically headed nut 50 received in a corresponding spherically concave recess 92 in that plate. The nut, as indicated above, carries axially extending teeth 52 about its periphery, and nut 50 is threadably received on foot 48 of the tie bar. Engaging the peripherial gear teeth 52 of the nuts are two rings 100, 102, as shown in FIGS. 5, 12 and 13, the inner surfaces of which carry gear teeth 104 and the outer surfaces of which carry ratchet teeth 106. A spacer ring 108 is located between the two gear rings and four pawls 110, located in axial slots in annular apron portion 112 of plate 36, are resiliently secured against the rings' ratchet surfaces 106 by garter spring 114. Snap ring 116 (FIG. 5) engages apron 112 to secure the rings 100, 102 and pawls 110 in axial position. In the position shown in FIG. 5, the pins 54 lock plate 38 (and armature ring 80) against rotation relative to the plate 36 and prevent clutch engagement due to transient angular accelerations for example. When field coil 14 is energized, a magnetic flux path is created which tends to draw the armature ring 80 and field cylinders 60, 62 towards one another. As the armature ring 80 is secured to plate 38 by means of bolts 82, it cannot move axially and therefore the field cylinders 60, 62 move towards the armature ring to reduce the air gap. This movement carries ring 70 against the conical points 90 of the lock pins 54 and drives them back through the apertures 86 so that relative rotation of plates 36, 38 is permitted. As indicated in FIG. 6, when the friction disc 68 contacts the rotating armature ring 80, that disc and the field cylinders 60, 62 impose a load on the armature which tends to slow it down. The resulting relative rotation is coupled through plate 38 to tilt tie bars 42 from the position shown in FIG. 7 to the position shown in FIG. 8. This tilting of the tie bars produces axial movement of plate 38 towards plate 36, compressing the stack of clutch discs 32, 34 in a clutch engaging operation to couple sleeve 16 to sleeve 30 for the transmission of mechanical power.

The combination of two rings 100, 102 with the nuts 50 and tie bars 42 provides an adjustment of the effective tie bar length as a function of the angle through which the tie bar is tilted when the clutch is actuated. The tie bar is rotated about a pivot point preferably located equidistant from the two rings 100, 102 as defined by the cooperation of the spherical nut and recess 92. This rotation or tilting produces a differential movement of the two ring gears 100, 102, and when this differential movement exceeds a predetermined limit, one of the ratchets is stepped. On de-energization of the clutch, the differential positions of the two rings turn the nuts 50 and shorten the effective length of the tie bars in an automatic wear compensation operation. The pivot location is so chosen that the rings are never driven against the ratchet direction by the skewing of the tie bar. In the illustrated embodiment, with clockwise actuation of the pressure plate, the outer ring 100 is advanced, and with counterclockwise rotation, the inner ring 102 is advanced. Thus, the threads move relative to each other only if the ratchet actually steps and not each time the clutch is actuated. Therefore, they are not subject to excessive wear.

An adjustment operation is shown diagrammatically in FIGS. 14–16. In FIG. 14 the mechanism is shown in the disengaged or unactuated position of FIG. 12. In that position ratchet tooth A of ring 100 and ratchet tooth C of ring 102 engage pawl 110. When the tie bar 42 is tilted, in the direction indicated in FIG. 12, there is no rotation of the nut 50 but rather a differential displacement of the ring gears. If the angle of tilt exceeds a predetermined value, ring 100 moves past pawl 110 so that the pawl is stepped from tooth C to tooth D of ring 102, as indicated in FIG. 15. When the tilting force of tie bar 42 is released, the springs 56 driving lock pins 54 tend to restore the bars to their axially aligned positions, and as the two rings 100, 102 must return to their original relative positions due to their corresponding engagement with the common gear teeth of nut 50, the nut 50 rotates and advances ring 100 from tooth A to tooth B as shown in FIG. 16. This rotation shortens the effective length of the tie bar due to the cooperation of the nut and the threads on the tie bar foot 48. A similar length adjustment occurs when the tie bar is tilted in the opposite direction. It will be noted that the tie bar length adjustment occurs during the resetting operation and not when the clutch is being engaged.

A second embodiment of the invention is shown in FIGS. 17–21, in which a modified form of tie bar is employed. The clutch unit is mounted on shaft 130 and has a first clutch member 132 keyed to the shaft and a second clutch member 134 mounted for rotation relative to shaft 130 on bearings 136. The first clutch member has an axially extending sleeve 138 to which a first set of clutch discs 140 are splined and a second set of clutch discs 142 are splined to sleeve member 134. A pressure plate 144 abuts one end of the disc stack with the other end seated on member 132. Bearing plate 146 is interposed between pressure plate 144 and armature plate 148. Armature plate 148 is secured for rotation with clutch member 132 by four tie bars 150.

Each tie bar 150, as indicated in FIGS. 17 and 18, has a head portion 152 with a spherical surface 154 similar to the previously described bars 42. The foot portion 156 has a series of serrations 158 formed on either side thereof. The head of each bar is received in a slotted formed depression in the periphery of armature plate 148, and its foot portion is secured by a stack of C-shaped laminations 160 which are received in pockets 162 (FIG. 17) in the clutch member 132. Return spring 164 (which is broken away in the central portion of FIG. 17 to expose a tie bar 150 secured between plate 148 and member 132) surrounds the member 132 and holds the tie bars 150 and laminations 160 in place. Armature plate 148 has tabs 166 which extend into slots 168 in the spring and the spring is secured to member 132 by screws 169.

In similar manner to the previously described embodiment, the clutch actuator includes a stationary field coil 170 housed within a U-shaped pole piece 172 which is mounted on bearing 174 so that it is free to rotate relative to axially movable field member 176 which is splined on sleeve 134. This rotating field structure is secured on sleeve 134 by means of snap ring 178. The rotating field structure also includes a magnetic barrier disc 180 and a field circuit completing ring 182.

When the field coil 170 is energized, magnetic flux flows through the path including pole piece 172, coupling member 180, armature plate 148 and field member 176. The movable field elements (176, 180) move toward armature plate 148 to reduce the air gap and assume the position shown in FIG. 19. The resulting load on the armature tilts the tie bars 150 and moves the armature toward the clutch disc stack and compresses that stack.

Tie bar length adjustment is accomplished as a function of tilt angle. The serrations 158 are engaged by the horseshoe laminations 160 which are stacked within recess 168 in the member 132, as shown diagrammatically in FIG. 20. When the clutch is engaged, if excessive tilting of the tie bar 150 results, as indicated in FIG. 21, the serrations will pick up (slide under) the edge of the corresponding laminations. Upon de-energization of the clutch and return to its disengaged position by spring 164, those picked-up laminations will hold these tie bar serrations, and the serrations on the opposite sides will then similarly pick up the other legs of those laminations and, as indicated in FIG. 22, shorten the effective tie bar length by a lamination thickness in a wear compensation operation.

A band clutch incorporating features of the invention is shown in FIGS. 23 and 24. That clutch incorporates actuator bars that are radially disposed. The clutch unit is mounted on shaft 200 and has a first member 202 secured to the shaft by means of key 204 and a second member 206 mounted on the shaft but supported for independent rotation by bearings 208.

The electromagnetic actuator employed in this embodiment includes a rotating field coil 210 which is energized through slip rings 212 and when energized, attracts armature member 214 into engagement with the non-magnetic friction ring insert 216. Four actuator elements 218 of the same configuration, as shown in FIG. 18, are employed and have their heads 220 positioned in recesses 222 in the armature. When the clutch is energized, the armature 214 slides on bearing 223 and is rotated by contact with friction insert 216 so that bars 218 are tilted and rock the clutch shoe carrying members 224 about pivots 226. These members move shoes 228 and clutch bands 230 outwardly into engagement with the inner sleeve surface 232 of the member 206. Again, as in the embodiment shown in FIG. 17, if the bars 218 are tilted through an excessive angle, one or more laminations 234 are picked up and, on release of the clutch, the length of the actuator bars is adjusted automatically for wear compensation.

While preferred embodiments of the invention have been shown and described, various modifications therein will be apparent to those skilled in the art. Features of the invention are equally applicable to brakes and clutches, for example. Actuators other than the electromechanical types disclosed may be used with devices constructed in accordance with the invention. Therefore, it is not intended that the invention be limited to the disclosed embodiments or to details thereof and departures may be made therefrom within the spirit and scope of the invention as defined in the claims.

What is claimed is:

1. A coupling device having first and second friction surfaces,
   said surfaces being movable relative to one another between a first position in which said surfaces are separated and a second position in which said surfaces meet frictionally in driving relation,
   an actuator element,
   means to tilt said actuator element through an angle effective to move said surfaces from said first position to said second position in a coupling device friction surface engaging operation, and
   means to adjust the effective length of said actuator element along its axis in an automatic wear compensation operation in response to the tilting of said actuator element through a predetermined angle in said coupling device friction surface engaging operation.

2. The coupling device as claimed in claim 1 wherein said length adjusting means comprises a serration portion on said actuator element and a plurality of laminations disposed in engaged relation with said serration portion.

3. The coupling device as claimed in claim 1 wherein said length adjusting means comprises a threaded portion on said actuator element,
   a nut threadedly received on said threaded portion, and means to rotate said nut relative to said actuator element as a function of the angle of tilt of said actuator element.

4. A mechanical force coupling device comprising a first member,
   a second member,
   a first frictional surface secured to said first member,
   a second frictional surface adapted to be placed in frictional engagement with said first surface secured to said second member,
   a back-up plate secured to one of said members,
   an actuator plate,
   a tie bar connected between said back-up plate and said actuator plate, and
   actuator means for moving said actuator plate relative to said back-up plate to tilt said tie bar and move said first frictional surface into engagement with said second frictional surface in a coupling action, said actuator including a field coil fixed in position, an armature plate secured to said actuator plate, and flux path means movable relative to said fixed field coil in response to energization of said field coil for engaging said armature plate and producing movement of said actuator plate relative to said back-up plate in a coupling action.

5. A mechanical force coupling device comprising a first member, a second member, a first frictional surface secured to said first member, a second frictional surface adapted to be placed in frictional engagement with said first surface secured to said second member, a back-up plate secured to one of said members, an actuator plate, a tie bar connected between said back-up plate and said actuator plate, actuator means for moving said actuator plate relative to said back-up plate to tilt said tie bar and move said first frictional surface into engagement with said second frictional surface in a coupling action, lock means for preventing movement of said actuator plate relative to said back-up plate, and means responsive to said actuator means to release said lock means.

6. The coupling device as claimed in claim 5 wherein said actuator plate has a recess therein and said lock means includes a lock member secured to said back-up plate and biased into engagement with said actuator plate recess to lock said back-up and actuator plates against relative movement.

7. A clutch comprising a driving member,
   a driven member,
   a first set of clutch elements secured to said driving member,
   a second set of clutch elements interleaved with said first set of clutch elements and secured to said driven member,
   said first and second sets of clutch elements being arranged in a stack,
   a back-up plate disposed at one end of said stack and an actuator plate disposed on the other end of said stack,
   a plurality of tie bars bridging said stack and being connected between said back-up plate and said actuator plate,
   actuator means including means axially movable relative to said clutch element stack for producing rotation of said actuator plate relative to said back-up plate for tilting said tie bars to compress said stack of clutch elements in a clutch engaging operation, and means to adjust, for automatic wear compensation, the effective length along its axis of each said tie bar in response to the tilting of said tie bars through a predetermined angle in a clutch engaging operation.

8. A clutch comprising a driving member,
   a driven member,
   a first set of clutch elements secured to said driving member, a second set of clutch elements interleaved with said first set of clutch elements and secured to said driven member, said first and second set of clutch elements being arranged in a stack, a back-up plate disposed at one end of said stack and an actuator plate disposed on the other end of said stack, a plurality of tie bars bridging said stack and being connected between said back-up plate and said actuator plate, lock means engaging said actuator plate for preventing rotation of said actuator plate relative to said back-up plate, and actuator means including means axially movable relative to said clutch element stack for releasing said lock means and producing rotation of said actuator plate relative to said back-up plate for tilting said tie bars to compress said stack of clutch elements in a clutch engaging operation.

9. The clutch as claimed in claim 8 wherein said actuator plate has a recess therein and said lock means includes a lock member secured to said back-up plate and biased into engagement with said actuator plate recess to lock said back-up and actuator plates against relative rotation.

10. The clutch as claimed in claim 7 wherein said length adjusting means comprises a serration portion on each said tie bar and a plurality of laminations disposed in engaged relation with said serration portion.

11. The clutch as claimed in claim 7 wherein said length adjusting means comprises a threaded portion on each said tie bar.

a nut threadedly received on said threaded portion, and means to rotate said nut relative to said tie bar as a function of the angle of tilt of said tie bar.

12. A clutch comprising a pair of clutch elements, one clutch element being secured to a driven member and the other clutch member being secured to the driving member, a plurality of tie bars, means to move one end of each of said tie bars relative to its other end along a circular path about the axis of said clutch to tilt said tie bars to force said one clutch element into engagement with the other element, and means for automatically adjusting the effective lengths of the tie bars along their axes in response to the tilting of said tie bars through a predetermined angle in a clutch engaging operation whereby wear is compensated.

13. The clutch as claimed in claim 12 wherein said adjusting means includes a rotatable nut disposed in threaded relation on said tie bar.

14. An electromagnetic clutch comprising a driving member, a driven member rotatable coaxially with said driving member, a first set of clutch elements secured to said driving member, a second set of clutch elements interleaved with said first set of clutch elements and secured to said driven member, said first and second set of clutch elements being arranged in a stack, a back-up plate disposed at one end of said stack and an actuator plate disposed on the other end of said stack, a plurality of tie bars bridging said stack and being connected between said back-up plate and said actuator plate, lock means engaging said actuator plate for preventing rotation of said actuator plate relative to said back-up plate, electromagnetic actuator means including a field coil fixed in position on said clutch, an armature plate secured to said actuator plate, flux path means axially movable relative to said fixed field coil in response to energization of said field coil for engaging said armature plate to produce rotation of said actuator plate relative to said back-up plate for tilting said tie bars to compress said stack of clutch elements in a clutch engaging operation, and means carried by said flux path means and operative in response to the energization of said field coil to release said lock means.

15. The clutch as claimed in claim 14 wherein said flux path means includes a first U-shaped magnetic conductor fixed to said coil and a second magnetic conductor secured to one of said members and wherein said armature plate is secured to the other of said members.

16. The clutch as claimed in claim 15 and further including means to adjust the effective length of said tie bars as a function of the angle through which said tie bars are tilted in said clutch engaging operation.

17. The clutch as claimed in claim 16 wherein each said length adjusting means comprises a serration portion on said tie bar and a plurality of laminations disposed in engaged relation with said serration portion.

18. The clutch as claimed in claim 16 wherein each said length adjusting means comprises a threaded portion on said tie bar, a nut threadedly received on said threaded portion, and means to rotate said nut relative to said tie bar as a function of the angle of tilt of said tie bar.

19. The clutch as claimed in claim 18 wherein each said nut has a gear surface, and further including two axially spaced ring gears, each ring gear having a gear surface engaging the gear surfaces of said nuts and a ratchet surface, pawl means engaging said ratchet surfaces for controlling the movement of said ring gears, and means for tilting each said tie bar about a pivot located equidistantly from said two ring gears.

20. The clutch as claimed in claim 19 wherein said actuator plate has a recess therein and said lock means includes a lock member secured to said back-up plate and biased into engagement with said actuator plate recess to lock asid back-up and actuator plates against relative rotation.

21. A clutch comprising a pair of clutch elements, one clutch element being secured to a driven member and the other clutch element being secured to the driving member, a plurality of tie bars, each said tie bar having a plurality of serrations, means to tilt said tie bars to force said one clutch element into engagement with the other clutch element, and means for adjusting the effective length of the tie bars as a function of the angle through which said tie bars are titlted including a stack of laminations that engage said tie bar serrations to secure said tie bars.

References Cited by the Examiner

UNITED STATES PATENTS

| 249,325 | 11/1881 | Edwards. | |
| 1,306,302 | 6/1919 | Cooper | 192—69 |
| 2,322,326 | 6/1943 | Taylor | 192—69 |
| 2,623,619 | 12/1952 | Clerk | 192—35 |
| 2,660,280 | 11/1953 | Shaddox | 192—35 X |
| 2,729,317 | 1/1956 | Schwab | 192—69 |
| 3,100,974 | 8/1963 | Wilson et al. | 192—54 X |

FOREIGN PATENTS

| 660,180 | 5/1938 | Germany. |
| 162,355 | 4/1921 | Great Britain. |
| 227,653 | 9/1943 | Switzerland. |

DAVID J. WILLIAMOWSKY, *Primary Examiner.*

DON A. WAITE, *Examiner.*

A. T. McKEON, *Assistant Examiner.*